Figure 1:
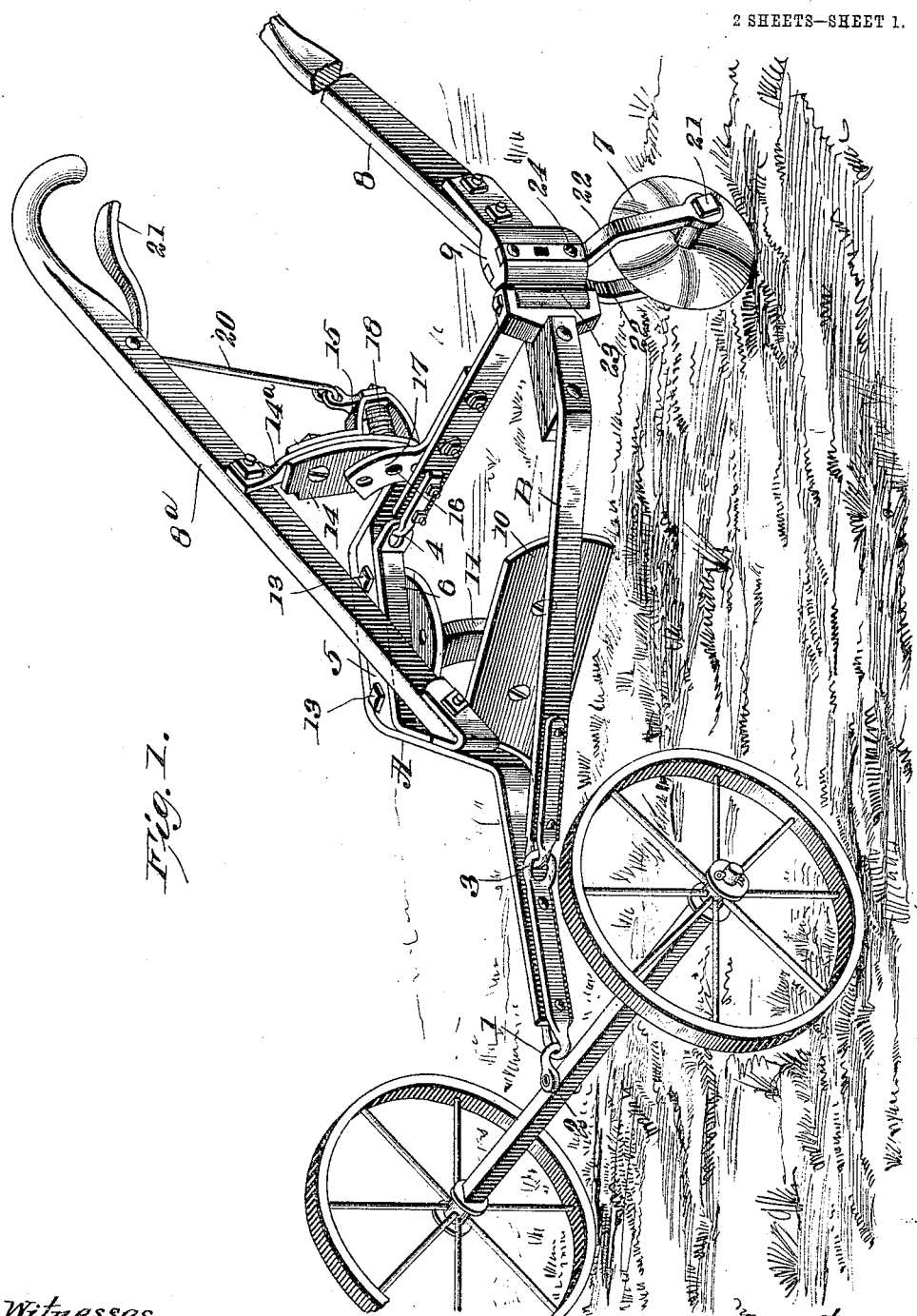

No. 816,418. PATENTED MAR. 27, 1906.
F. W. ANDERSON.
HORSE HOE.
APPLICATION FILED JAN. 11, 1906.

2 SHEETS—SHEET 1.

Witnesses
Inventor
FRANK W. ANDERSON
By Munn & Co.
Attorneys.

No. 816,418. PATENTED MAR. 27, 1906.
F. W. ANDERSON.
HORSE HOE.
APPLICATION FILED JAN. 11, 1906.
2 SHEETS—SHEET 2.
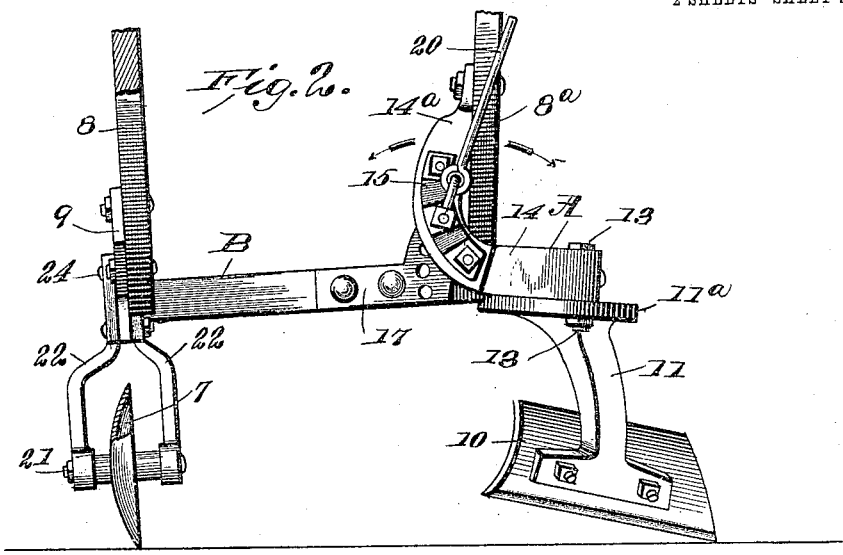
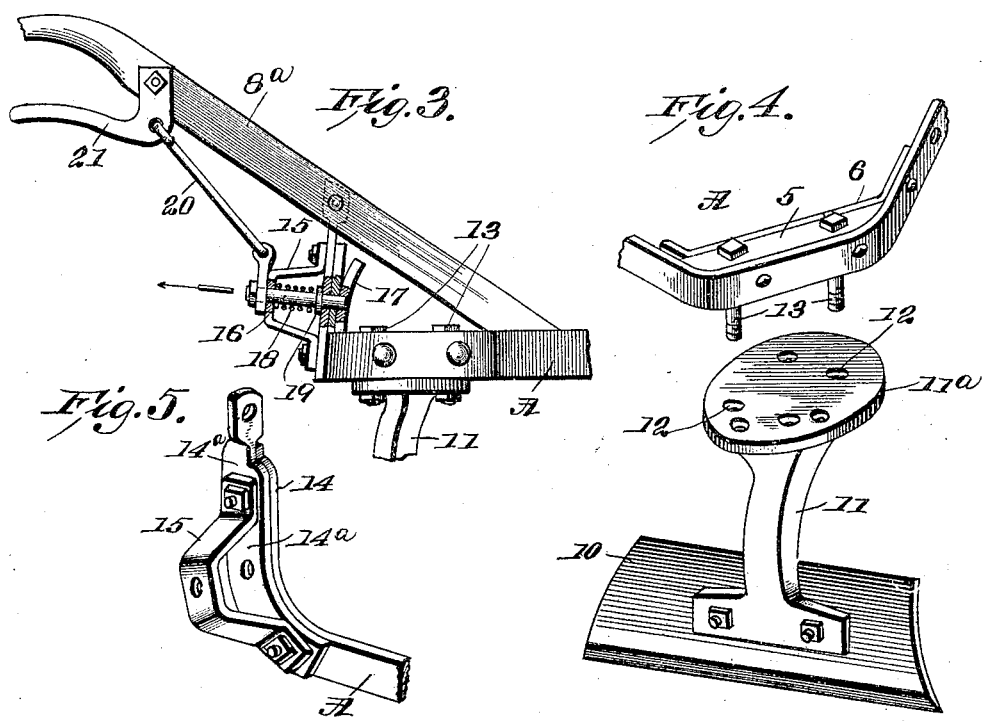
WITNESSES:
E. M. Callaghan.
Amos W. Hart
INVENTOR
FRANK W. ANDERSON
BY Munn & Co.
ATTORNEYS

UNITED STATES PATENT OFFICE.

FRANK W. ANDERSON, OF WESTFIELD, NEW YORK.

HORSE-HOE.

No. 816,418.      Specification of Letters Patent.      Patented March 27, 1906.

Application filed January 11, 1906. Serial No. 295,601.

*To all whom it may concern:*

Be it known that I, FRANK W. ANDERSON, a citizen of the United States, and a resident of Westfield, in the county of Chautauqua and State of New York, have invented an Improvement in Horse-Hoes, of which the following is a specification.

My invention is a disk horse-hoe for use in cultivating grape-vines, raspberries, shrubbery, and plants of various kinds.

The main feature of novelty is the construction and combination of parts whereby a hoe or cultivating-blade may be adjusted to and held at different vertical and horizontal angles.

The invention further includes other features, as hereinafter set forth, and illustrated in the accompanying drawings, in which—

Figure 1 is a perspective view of my improved horse-hoe. Fig. 2 is mainly a rear view of the same, some parts being shown in section. Fig. 3 is in part a side elevation and in part a vertical section of a rear portion of the implement. Fig. 4 is a perspective view illustrating the construction of the shank of the hoe or blade and the portion of the frame to which it is attached. Fig. 5 is a perspective view of a rear portion of the frame.

The frame of the implement or machine to which the cultivating devices proper are attached is connected by a loose joint 1 with the axle 2 of a forward truck, to which a team may be attached in any suitable manner by means of a pole or shafts. The frame is constructed of two main parts A and B, which are formed and constructed as follows: The bar A is bent twice at an obtuse angle, and its rear extremity is bent at a right angle. The bar B is bent at an obtuse angle and its rear portion at a right angle. The forward end of the bar B is loosely coupled with the bar A at a point 3 a short distance in rear of the axle 2. It will be noted (see Fig. 1) that the obtuse angles of the bar A are in rear of this coupling-point. The inner end of the rear portion of the frame-bar B is loosely coupled at 4 to the bar A. As shown in Fig. 1, such coupling-point is adjacent to the rear angle or corner of the frame A and on the inner side of the same. A block 5 (see Figs. 1 and 4) is arranged at that point, and a short angular bar 6 is bolted to the inner side of it and provided with an eye which forms a portion of the coupling 4. At the rear angle or corner of the frame-bar B is arranged a concavo-convex disk 7, which serves as a support for such portion of the frame and also as a steering or guiding device having important functions, as will be presently described. A handle 8 is attached to a frame or block 9, which is pivoted to the bar B and to which the disk 7 is attached. The blade or cultivating-hoe 10 (see Figs. 1, 2, and 4) is attached to the T-shape shank 11, having an enlarged flat head $11^a$, which is provided with holes 12 near its front and rear edges. Two bolts 13 (see Figs. 1 and 4) pass through the block 5, before described, and through certain of the holes 12. By shifting the bolts from one hole to another it is obvious that the horizontal angle of the blade 10 may be changed as conditions require. Thus it may be placed at such an angle as to draw the earth away from a row of vines or plants or to force earth toward the same, or it may be placed at right angles to the line of draft.

The purpose of coupling the frame-bars A and B together at points 3 4, as before described, is to enable the vertical angle of the blade 10 to be changed. The means for effecting this and for locking the blade in any required position or angle are as follows: The rear end 14 of the frame-bar A is bent upward at a right angle, and a reinforce or separate plate $14^a$ is bolted thereto, as shown best in Fig. 5. The upper end of the reinforce $14^a$ is provided with an eye by which it is attached to the handle $8^a$. By this means the said handle is rigidly connected with the frame-bar A, and it is obvious that by manipulation of the handle—that is to say, by raising or lowering its outer end—the frame-bar A may be rocked on the front coupling 1, and the frame-bar B will correspondingly rock on the pivots or couplings 3 and 4, so that the two frame-bars may be placed in the same horizontal plane as in Fig. 1, or at an angle to each other, as indicated in Fig. 2. A V-shape bracket or keeper 15 (see Figs. 1, 3, and 5) is attached to the reinforce $14^a$, and the same bolts secure it and the reinforce together and to the upward extension 13 of bar A. Coincident holes are formed in the bracket and the parts 14 $14^a$ to receive a locking-bolt 16. The inner end of the latter is adapted to enter any one of several registering holes (see Fig. 1) which are formed in the upwardly-projecting portion of an obtuse-angle plate 17, which is bolted to the rear portion of the frame-bar B. (See especially Figs. 1 and 2.) A spiral spring 18 (see Figs. 1 and 3) encircles the slidable bolt 16 between the bracket 15 and a collar 19, which is fixed on the shaft. The spring therefore tends to force the bolt forward, so as to hold it normally engaged with the parts having coincident openings as specified. For the purpose of retracting the bolt, and thus unlocking the parts when desired, I connect it by links 20 with an elbow-lever 21, (see Fig. 3,) which is pivoted to the handle 8ᵃ in suitable proximity to the grip portion of the latter. It is obvious that by pressing upward on the free end of such elbow-lever tractive force will be applied to the bolt 16, and thus the tension of the spring 18 being overcome the bolt may be withdrawn so as to permit the frame-bar A to be rocked and the hoe or plate 10 thereby placed at a different position or angle.

In using the implement under ordinary conditions the blade 10 may be placed and held horizontal, as indicated in Fig. 1; but in case an obstruction is encountered—such, for example, as a root or a hard bunch of earth or grass, which the blade might be unable to cut or dislodge—the operator presses downward on the handle 8ᵃ and at the same time retracts the bolt 16, whereby the blade 10 may be quickly adjusted at an angle, its left-hand lower or rear corner in such case alone resting and sliding on the ground. It is thus adapted to ride safely over a root or other obstruction. Again by pressing upward on handle 8ᵃ and simultaneously releasing the lock the blade 10 may be placed at the opposite angle, (shown in Fig. 2,) its right-hand lower corner drawing into the soil, so as to remove sod or grass or briars, &c. These adjustments may be easily and quickly effected, and the blade 10 may be also set horizontal when required, in which case it will project and work beneath a trellis-wire. It will be seen that by provision of the T-shape shank 11 I am enabled to provide a long bearing or support for the oblong blade, which is a matter of considerable importance, especially when the blade is made comparatively thin. Thus, as before described, I provide for important adjustments of the said hoe or blade—namely, for its adjustment at different angles horizontally and vertically, in any of which it may be rigidly secured.

The chief function of the concave disk 7 is to guide or steer and resist thrust of the blade 10. It is journaled upon an axle 21, which is held in the lower end of arms 22, the same being adjustably attached to the block or bar 9, which is pivoted at 23 to the rear angle of the frame-bar B, as before described. It is obvious that by moving the grip end of the handle 8 to the right or left the frame-piece 9 will swing on its pivot horizontally, and the disk 7 may be thereby placed at different angles to the line of draft, so as to take more or less earth and offer more or less lateral resistance to the action or leverage of blade 10.

The arms 22, which carry the disk 7, are fitted in vertical grooves formed in opposite sides of the thickened piece or block 9 and are secured adjustably therein by means of screw-bolts 24. The portions of the bars which fit in said grooves are parallel and straight and provided with a series of holes to receive the said bolts, so that they are adapted for adjustment vertically as may be required. It will be seen that the portions of the bars 22 which extend below the block 9 are not in the same vertical plane with those portions which lie in the grooves. In Fig. 1 they are shown extended rearward. It is obvious that by detaching them from the block 9 and substituting one for the other they may be so placed that the lower pendent portions will project forward instead of rearward. The importance of this will appear from the following statement: When the hoe or blade 10 is placed horizontal and at the lateral angle indicated in Fig. 1, it will tend to draw outward, and this tendency is counteracted by the disk 7, whose concave side is toward the blade. If, on the other hand, the blade should be placed at the opposite angle, it would tend to crowd toward or in the direction of the disk 7, and hence to resist such tendency the concave side of the latter should be reversed or placed outward. Thus whenever the angle of the blade is reversed the disk 7 is reversed correspondingly in order to resist side thrust. When concave or dished side of disk 7 is toward the right, by moving handle 8 laterally a little to the right the disk will be placed at angle opposite the angle of the blade, and it will draw into the soil and offer lateral resistance enough to keep the blade 10 from drawing too far under a trellis-wire. In brief, by turning the disk slightly right or left the resistance to the lateral draw of blade 10 may be increased or lessened at will and a furrow of corresponding width will be cut. In brief, the disk 7 and its handle 8 serve as means for governing the lateral cut of the blade 10 with accuracy and ease. This is very advantageous, especially for guiding the blade past posts and stakes and under wires and bars or rails that support the wires, &c. It will be further apparent that when the arms 22, in which the disk 7 is journaled, are inclined rearward the side leverage or pressure on the disk is less than it would be if the arms were inclined forward. In other words, the effect of side thrust is nearly one-half greater when the arms 22 are so placed as to incline forward, and it is least when they incline rearward. The required adjustment will therefore be made according to conditions, and especially according to the greater or less horizontal angle at which the blade 10 may be placed. Thus the position of the disk 7, or rather its concave side, relative to the blade 10 is important for resistance of thrust, and the adjustment of the disk 7 farther forward or back is also relatively important. It will be further noted that by suitable manipulation of the handle 8 the disk 7 may be turned on the pivot 23 to cause it to take more or less earth, and thus cut a wider or narrower furrow, as conditions may require, and this change of inclination or horizontal angle of the disk may be varied at the will of the operator to cause the hoe as a whole to work in the required manner.

When the ground is dry and hard, it may be desirable to weight the disk 7 in order to make it take into the ground to a greater depth than would otherwise be the case, and in such event it would be advisable that the standards or bars 22 should be inclined forward, so as to relieve strain on the pivot-bolt.

Having thus described my invention, what I claim as new, and desire to secure by Letters Patent, is—

1. The improved horse-hoe comprising a forward truck, a frame composed of two angular bars which are loosely coupled or jointed together at front and rear points, one of said bars having a hoe or cutting-blade attached to and pendent therefrom, and the other bar having a cutting-disk attached to and pendent therefrom, handles connected with the respective bars, and means for locking the two bars in any required angle or adjustment to each other, the same being attached adjacent to the rear coupling, and devices connected therewith and under the control of the operator for locking and releasing the same, substantially as described.

2. The improved horse-hoe comprising a forward truck, a frame which is loosely connected therewith and comprises two angular bars which are loosely coupled at front and rear points, one bar having a pendent blade attached thereto, a rotatable cutting-disk which is pivotally connected with the rear angle of the opposite bar, handles which are rigidly attached to the first-named bar and to the pivotal connection of the cutting-disk, the said bars having means for locking them at different angles or adjustments, the same comprising upward projections of the adjacent and overlapping ends of the rear bars which have a series of openings, a retractable spring locking-pin adapted to enter such openings, and a device connected with the adjacent handle and under the control of the operator whereby the pin may be retracted to allow adjustment or rocking of the bars on each other, for placing them at different angles, substantially as described.

3. The improved cultivating implement comprising a forward truck and a frame connected therewith and comprising two bars which diverge laterally in their central portions and are extended toward each other in the rear, the two being jointed together at front and rear, cultivating devices connected with the respective bars at their rear angles, and means for locking the bars rigidly together in a horizontal plane or at different angles thereto, substantially as described.

4. The combination, with the frame comprising bars which diverge from each other in their central portions and having rear portions that extend toward each other, the said frames being connected by loose joints at front and rear so that each may be rocked on the other, a blade attached to and pendent from one of said beams and adapted to be shifted at different horizontal angles, and a reversible concavo-convex disk connected with the other bar, and handles connected with the respective bars, substantially as described.

5. The combination, with a front truck and a frame composed of angular bars which are loosely jointed together and provided with means for locking them in any required adjustment or angle, of a pendent blade having a shank provided with an enlarged head having a series of openings, and screw-bolts adapted to pass through said openings and to secure the blade to the bar at any required angle or adjustment, substantially as described.

6. The combination, with the frame comprising angular bars which are coupled loosely at front and rear points and provided with means for locking them at any required angle, of a cutting-disk, arms in which the same is journaled, a block to which the said arms are adjustably secured, the said block being pivoted to one of the frame-bars and provided with a handle, substantially as described.

7. The combination, with a frame comprising two bars which diverge laterally from each other in their middle portions and have rear portions extending toward each other, the two being loosely jointed together at front and rear and provided with means for locking them in any required adjustment, a cutting-blade which is adjustably attached to one of the bars, and a concavo-convex disk arranged at the opposite angle of the frame, a rear frame-piece which is pivoted at that point so as to swing laterally, arms 22 which are detachably secured to such frame-piece, their lower portions being arranged at an angle to the upper ones so that the disk will be carried forward or backward by reversal of the arms in the manner described.

FRANK W. ANDERSON.

Witnesses:
CORA E. OTTAWAY,
HARRY C. WILLIAMSON.